United States Patent
Singh

(10) Patent No.: US 12,488,946 B2
(45) Date of Patent: *Dec. 2, 2025

(54) PRECISE MULTI-STATE TUNING FOR CHANGING RESISTANCE STATES OF RECONFIGURABLE INTELLIGENT SURFACE UTILIZING ADVANCED MATERIALS

(71) Applicant: Dell Products L.P., Round Rock, TX (US)

(72) Inventor: Tejinder Singh, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 212 days.

This patent is subject to a terminal disclaimer.

(21) Appl. No.: 18/194,685

(22) Filed: Apr. 3, 2023

(65) Prior Publication Data

US 2024/0331950 A1    Oct. 3, 2024

(51) Int. Cl.
*H01G 7/04* (2006.01)
*H01G 4/38* (2006.01)

(52) U.S. Cl.
CPC ............... *H01G 7/04* (2013.01); *H01G 4/38* (2013.01)

(58) Field of Classification Search
None
See application file for complete search history.

(56) References Cited

U.S. PATENT DOCUMENTS

| 11,133,588 B1 | 9/2021 | Matos et al. |
| 12,126,094 B2 | 10/2024 | Gharbieh et al. |
| 2016/0071653 A1* | 3/2016 | Lamorey ............. H05B 3/0004 216/6 |

(Continued)

FOREIGN PATENT DOCUMENTS

EP   4 175 068   5/2023

OTHER PUBLICATIONS

Nokia Bell Labs, "Communications in the 6G Era", Sep. 9, 2020, https://www.bell-labs.com/institute/white-papers/communications-6g-era-white-paper/ffgref (download link: https://onestore.nokia.com/asset/207766).

(Continued)

*Primary Examiner* — Eric W Thomas
(74) *Attorney, Agent, or Firm* — Amin, Turocy & Watson, LLP

(57) ABSTRACT

The technology described herein is directed towards phase-change material-based (e.g., chalcogenide) radio frequency components that can be used in unit cells of a reconfigurable intelligent surface. A multi-state tunable capacitive element for reconfigurable operation is described, in which phase-change material operates as a switching element to controllably vary capacitance of each unit cell. The multi-state tunable capacitive element can be made of multiple subcircuits in which capacitors of various values can be selectively switched in or out to vary the capacitance of the multi-state tunable capacitive element, resulting in a phase change of a unit cell with respect to reflecting or refracting an electro- (Continued)

magnetic wave. By arranging the subcircuits with capacitors of different values, and actuating each one in or out of the overall capacitive element, an analog-like variable capacitor is provided to provide more granular phase shift control of cells of a reconfigurable intelligent surface.

20 Claims, 10 Drawing Sheets

(56) References Cited

U.S. PATENT DOCUMENTS

| | | | |
|---|---|---|---|
| 2017/0263179 A1 | 9/2017 | Aurongzeb et al. | |
| 2018/0053603 A1* | 2/2018 | Al-Hazmi | H01G 4/206 |
| 2018/0166220 A1* | 6/2018 | Lazarus | H01G 7/04 |
| 2024/0032445 A1 | 1/2024 | Solomko et al. | |
| 2024/0329253 A1 | 10/2024 | Singh | |
| 2024/0331951 A1 | 10/2024 | Singh | |
| 2024/0332794 A1 | 10/2024 | Singh | |

OTHER PUBLICATIONS

D. Kitayama, Y. Hama, K. Miyachi, Y. Kishiyama, "Research of Transparent RIS Technology towards 5G evolution & 6G", in NTT DOCOMO Technical Journal, vol. 23, No. 2, Oct. 1, 2021.

E. Calvanese Strinati, G. C. Alexandropoulos, V. Sciancalepore, M. Di Renzo et al., "Wireless Environment as a Service Enabled by Reconfigurable Intelligent Surfaces: The RISE-6G Perspective", in (Jun. 6-9, 2021) Joint European Conference on Networks and Communications & 6G Summit (EuCNC/6G Summit): 6G Enabling Technologies, DOI:10.1109/EuCNC/6GSummit51104.2021. 9482474.

T. Singh, R. R. Mansour, "Chalcogenide Phase-Change Material Germanium Telluride for Radio-Frequency Applications: An Overview," in IEEE Nanotechnology Magazine 16 (3), pp. 26-41, Date of Publication: Apr. 13, 2022, DOI: 10.1109/MNANO.2022. 3160772.

T. Singh, R. R. Mansour, "Experimental Investigation of Performance, Reliability, and Cycle Endurance of Nonvolatile DC-67 GHz Phase-Change RF Switches," in IEEE Transactions on Microwave Theory and Techniques, vol. 69, No. 11, pp. 4697-4710, Nov. 2021, Date of Publication: Sep. 1, 2021, DOI: 10.1109/TMTT.2021. 3105413.

H. Yang, X. Cao, F. Yang, J. Gao, S. Xu, M. Li, Z. Chen, Y. Zhao, Y. Zheng, and S. Li, "A programmable metasurface with dynamic polarization, scattering and focusing control," Scientific Reports, vol. 6, Article No. 35692, pp. 1-11, Oct. 24, 2016.

N. Kaina, M. Dupre, G. Lerosey, and M. Fink, "Shaping complex microwave fields in reverberating media with binary tunable metasurfaces," Scientific Reports, vol. 4, Article No. 6693pp. 1-7, Aug. 2014, Published: Oct. 21, 2014.

L. Dai, B. Wang, M. Wang, X. Yang, J. Tan, S. Bi, S. Xu, F. Yang, Z. Chen, M. Di Renzo, C.-B. Chae, and L. Hanzo, "Reconfigurable Intelligent Surface-Based Wireless Communications: Antenna Design, Prototyping, and Experimental Results," in IEEE Access, vol. 8, pp. 45913-45923, Date of Publication: Mar. 2, 2020, DOI: 10.1109/ACCESS.2020.2977772.

Macom, "GaAs Beamlead PIN Diode," https://cdn.macom.com/datasheets/MA4GP905.pdf, Retrieved from the Internet: Mar. 2, 2023.

Singh, et al., "Miniaturized 6-Bit Phase-Change Capacitor Bank with Improved Self-Resonance Frequency and Q," Proceedings of the 52nd European Microwave Conference, Sep. 27-29, 2022, Milan, Italy.

Singh, et al., "Chalcogenide GeTe-Based Non-Volatile Switched K-Band Tunable Reflective Load for Reconfigurable RF Circuits," 2022 IEEE/MTT-S International Microwave Symposium—IMS 2022, Jun. 19-24, 2022.

Singh, et al., "Reconfigurable and Scalable Monolithic Band Reject Circuit Utilizing Phase-Change Switch Matrices," Proceedings of the 16th European Microwave Integrated Circuits Conference, Apr. 3-4, 2022, London, UK.

Singh, et al., "Scalable Non-Volatile Chalcogenide Phase Change GeTe-Based Monolithically Integrated mmWave Crossbar Switch Matrix," 2021 IEEE/MTT-S International Microwave Symposium, Jun. 6, 2021-Jun. 11, 2021.

Singh, et al., "Reconfigurable PCM GeTe-Based Latching 6-Bit Digital Switched Capacitor Bank," Proceedings of the 15th European Microwave Integrated Circuits Conference, Jan. 11-12, 2021, Utrecht, The Netherlands.

Singh, et al., "Miniaturized Reconfigurable 28 GHz PCM-Based 4-bit Latching Variable Attenuator for 5G mmWave Applications," 2020 IEEE/MTT-S International Microwave Symposium, Tue, Aug. 4, 2020-Thu, Aug. 6, 2020.

Singh, et al., "A Miniaturized Monolithic PCM Based Scalable Four-Port RF Switch Unit-Cell," Proceedings of the 49th European Microwave Conference, Oct. 1-3, 2019, Paris, France.

Singh, et al., "Monolithic PCM Based Miniaturized T-type RF Switch for Millimeter Wave Redundancy Switch Matrix Applications," 2019 IEEE/MTT-S International Microwave Symposium, Jun. 2-7, 2019 in Boston, Massachusetts.

Singh, et al., "Characterization of Phase Change Material Germanium Telluride for RF Switches," Proceedings of the 48th European Microwave Conference, Sep. 25-27, 2018, Madrid, Spain.

Singh, et al., "Chalcogenide Phase Change Material GeTe Based Inline RF SPST Series and Shunt Switches," IEEE MTT-S International Microwave Workshop Series on Advanced Materials and Processes for RF and THz Applications (IMWS-AMP 2018), Jul. 16-18, 2018, Ann Arbor, MI, USA.

Singh, et al., "Compact 26-30 GHz Reflection-Type Phase Shifter With 8-Bit Switched Phase Tuning Utilizing Chalcogenide Phase-Change Switches," IEEE Transactions on Microwave Theory and Techniques, vol. 71, No. 1, Jan. 23, 2023.

Singh, et al., "Ultra-Compact Phase-Change GeTe-Based Scalable mmWave Latching Crossbar Switch Matrices," IEEE Transactions on Microwave Theory and Techniques, vol. 70, No. 1, Jan. 1, 2022.

Singh, et al., "Experimental Investigation of Thermal Actuation Crosstalk in Phase-Change RF Switches Using Transient Thermoreflectance Imaging," IEEE Transactions on Electron Devices, vol. 68, No. 7, Jul. 7, 2021.

Singh, et al., "Non-Volatile Multiport DC—30 GHz Monolithically Integrated Phase-Change Transfer Switches," IEEE Electron Device Letters, vol. 42, No. 6, Jun. 1, 2021.

Singh, et al., "Scalable mmWave Non-Volatile Phase Change GeTe-Based Compact Monolithically Integrated Wideband Digital Switched Attenuator," IEEE Transactions on Electron Devices, vol. 68, No. 5, May 1, 2021.

Singh, et al., "Investigation Into Self Actuation Limitation and Current Carrying Capacity of Chalcogenide Phase Change GeTe-Based RF Switches," IEEE Transactions on Electron Devices, vol. 67, No. 12, Dec. 1, 2020.

Singh, et al., "Loss Compensated PCM GeTe-Based Latching Wideband 3-bit Switched True-Time-Delay Phase Shifters for mmWave Phased Arrays," IEEE Transactions on Microwave Theory and Techniques, vol. 68, No. 9, Sep. 1, 2020.

Singh, et al., "Miniaturized DC-60 GHz RF PCM GeTe-Based Monolithically Integrated Redundancy Switch Matrix Using T-Type Switching Unit Cells," IEEE Transactions on Microwave Theory and Techniques, vol. 67, No. 12, Dec. 1, 2019.

Singh, et al., "Characterization, Optimization, and Fabrication of Phase Change Material Germanium Telluride Based Miniaturized DC—67 GHz RF Switches," IIEEE Transactions on Microwave Theory and Techniques, vol. 67, No. 8, Aug. 1, 2019.

Singh et al. "Predictive Model for Reconfiguration of Phase Change Material-Based Reconfigurable Intelligent Surface" U.S. Appl. No. 19/023,264, filed Jan. 15, 2025, 42 pages.

Zhuang, et al., "Future Internet Bandwidth Trends: An Investigation on Current and Future Disruptive Technologies", Secure Systems Lab, Dept. Comput. Sci. Eng., Polytech. Inst. New York Univ., New York, NY, USA, Tech. Rep. TR-CSE-2013-04, Nov. 1, 2013.

Poulakis, "Metamaterials Could Solve One of 6G's Big Problems [Industry View]," in Proceedings of the IEEE, vol. 110, No. 9, pp. 1151-1158, Sep. 3, 2022, DOI: 10.1109/JPROC.2022.3196696.

(56) References Cited

OTHER PUBLICATIONS

Subrt, et al., "Controlling Propagation Environments Using Intelligent Walls," in 2012 6th European Conference on Antennas and Propagation (EUCAP), doi:10.1109/eucap.2012.6206517. 2012.
Kaina, et al., "Shaping complex microwave fields in reverberating media with binary tunable metasurfaces," ScientificReports, vol. 4, pp. 1-7, Published Oct. 21, 2014, DOI: 10.1038/srep06693.
Dai, et al., "Reconfigurable Intelligent Surface-Based Wireless Communications: Antenna Design, Prototyping, and Experimental Results," in IEEE Access, vol. 8, pp. 45913-45923, date of publication Mar. 2, 2020, DOI: 10.1109/ACCESS.2020.2977772.
International Search Report and Written Opinion for PCT Application No. PCT/US2024/013896 mailed Sep. 5, 2024, 18 pages.
Rodrigues Davi V Q et al: "Optimized phase shifts in intelligent reflective surfaces for robust radar-based indoor coverage enhancement" Radar Sensor Technology XXVII, Proc. of SPIE, vol. 12535, Jun. 14, 2023, 13 pages.
Molero Carlos et al: "Metamaterial-Based Reconfigurable Intelligent Surface: 3D Meta-Atoms Controlled by Graphene Structures" IEEE Communications Magazine, IEEE Service Center, Piscataway, US, vol. 59, No. 6, Jul. 5, 2021 {Jul. 5, 2021}, pp. 42-48.
Singh et al. "Reconfigurable Intelligent Surfaces Using Latching Rotational Patterns of Chalcogenide Elements" U.S. Appl. No. 18/512,304, filed Nov. 17, 2023, 33 pages.
Singh et al. "Energy Efficient Ultra-Wideband Latching Tunable Metasurfaces" U.S. Appl. No. 18/616,802, filed Mar. 26, 2024, 34 pages.
Rajatheva et al., "White Paper on Broadband Connectivity in 6G", Apr. 30, 2020, 46 pages.
Renzo et al., "Smart Radio Environments Empowered by Reconfigurable Intelligent Surfaces: How It Works, State of Research, and The Road Ahead", IEEE, Apr. 20, 2020, 74 pages.
Poulakis Marios, "Metamaterials Could Solve One Of 6g's Big Problems", IEEE Spectrum, Sep. 3, 2022, 24 pages.
NTT Docomo, "White paper: 5G Evolution and 6G", NTT Docomo Inc., Jan. 2022, 60 pages.
Jacobsen Jake, "Application in Illumination Design: Analyzing LiDAR Return Signal Strengths for Target Optical Surfaces and Atmospheric Conditions", White Paper, Synopsys, May 2020, 7 pages.
Wikstrom et al., "6G-Connecting a Cyber-physical World", Ericsson White Paper, Feb. 2022, 31 pages.
Basar et al., "Wireless Communications Through Reconfigurable Intelligent Surfaces" IEEE, Jul. 19, 2019, 20 pages.
Subrt et al., "Controlling Propagation Environments Using Intelligent Walls," Proceedings of the 6th European Conference on Antennas and Propagation (EUCAP), Mar. 26-30, 2012, 30 pages.
Huang et al., "Reconfigurable Metasurface for Multifunctional Control of Electromagnetic Waves", Advanced Optical Materials, 2017, 7 pages.
Debogovic et al., "Low Loss MEMS-Reconfigurable 1-Bit Reflectarray Cell with Dual-Linear Polarization", IEEE Transactions on Antennas and Propagation, vol. 62, No. 10, Oct. 2014, 6 pages.
Zendejas et al. "Magnetic MEMS Reconfigurable Frequencyelective Surfaces", Journal of Microelectromechanical Systems, vol. 15, No. 3, Jun. 2006, 11 pages.
Notice of Allowance received for U.S. Appl. No. 18/194,711 dated Jun. 17, 2025, 5 pages.
Ex Parte Quayle Action received for U.S. Appl. No. 18/194,711 dated Apr. 2, 2025, 9 pages.
Office Action dated Oct. 22, 2025 for U.S. Appl. No. 18/194,718.

\* cited by examiner

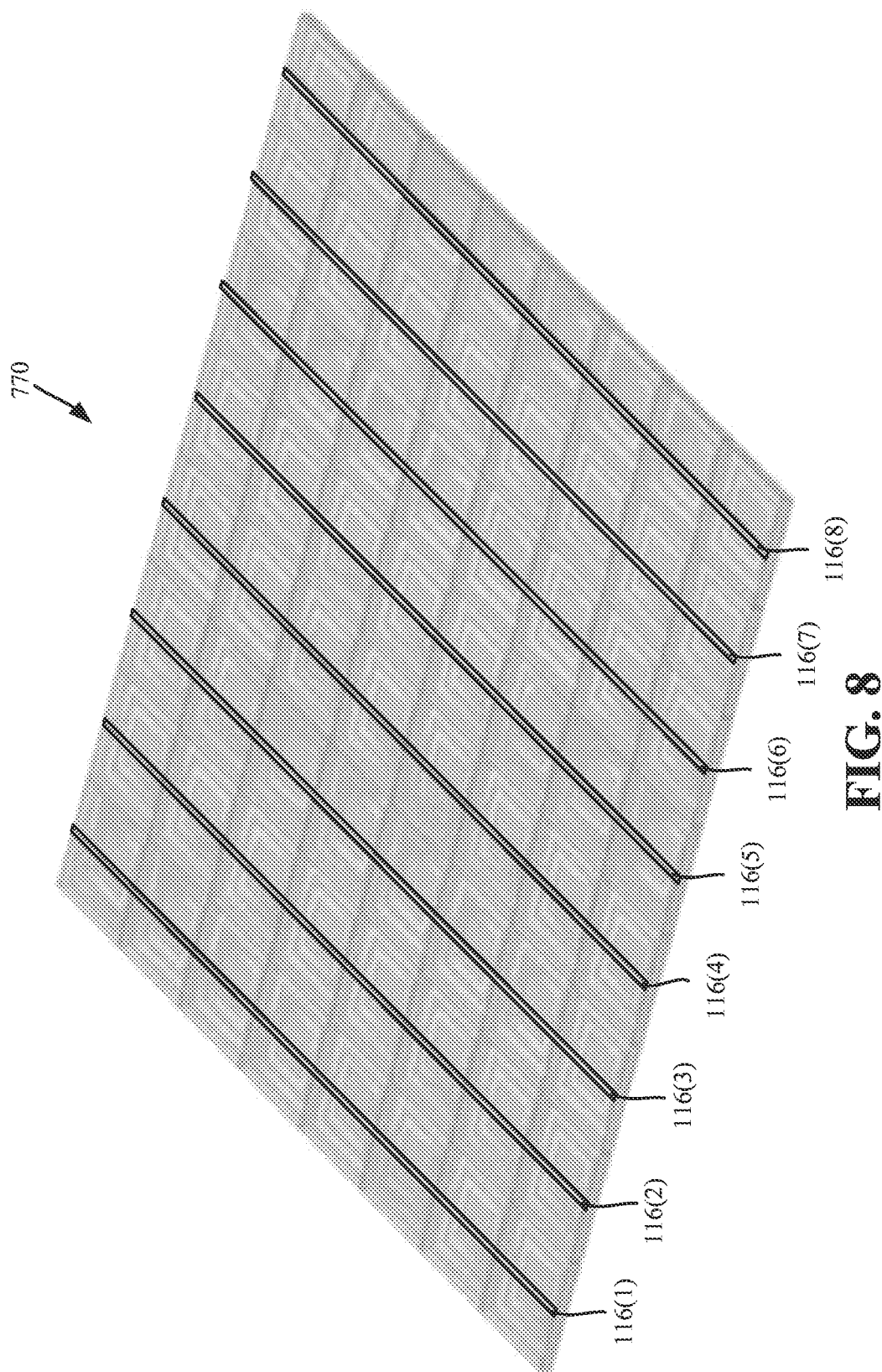

PRECISE MULTI-STATE TUNING FOR CHANGING RESISTANCE STATES OF RECONFIGURABLE INTELLIGENT SURFACE UTILIZING ADVANCED MATERIALS

BACKGROUND

Reconfigurable intelligent surfaces are specifically designed manmade surfaces of electromagnetic material, referred to as metamaterial, that are electronically controlled with integrated electronics. Metamaterials are artificially engineered materials fabricated using a stack of metal and dielectric layers. These thin two-dimensional metasurfaces can tune an electromagnetic wave's key properties, such as amplitude, phase, and polarization, as the electromagnetic wave is reflected or refracted by the surface. In other words, a reconfigurable intelligent surface is a two-dimensional surface whose surface can be electronically altered such that it changes the characteristics of any incoming electromagnetic wave, including the wave's phase.

Each metasurface typically is made up of (possibly up to) hundreds or thousands of unit-cells, and because the individual unit-cell can be controlled, reconfigurable intelligent surfaces can provide programmable and smart wireless environments. For example, one scenario is to use such a surface to intelligently reconfigure wireless communications. More particularly, objects in the path of a wireless signal, such as buildings and trees, can block wireless communication signals at higher frequencies, such as millimeter-wave frequency bands (24.5 GHz-52.6 GHz), which are expected to move upwards to sub-terahertz bands. This can be overcome by installing a large number of base stations to provide coverage to otherwise blocked areas, but doing so would increase the infrastructure costs many times. Instead, a relatively inexpensive metasurface can be installed at various locations to reflect and/or refract higher frequency signals to otherwise blocked or weak coverage areas.

Various ways to control reconfigurable intelligent surfaces have been implemented, including those based on switching technologies such as field-effect transistors (FETs) and PIN diodes (formed from a p-type semiconductor, an undoped intrinsic region and an n-type semiconductor). With such switches used in each unit cell, the wireless operating frequency is a major factor because each of these existing switch technologies has different maximum operating frequencies and other frequency-dependent characteristics. For wireless communications beyond fifth generation (5G), such as 6G's sub-terahertz bands and even future terahertz bands, switch technologies like PIN diodes and FETs are not suitable. Further, with these technologies, switch size factors, ON-state series resistance, and overall power consumption (e.g., PIN diodes require continuous power when in an ON state, and there can be hundreds or thousands of unit cells) are also significant drawbacks.

BRIEF DESCRIPTION OF THE DRAWINGS

The technology described herein is illustrated by way of example and not limited in the accompanying figures in which like reference numerals indicate similar elements and in which:

FIG. 8 is a bottom view representation of the example 8×8 lattice of unit-cells forming a reconfigurable intelligent surface, in accordance with various aspects and implementations of the subject disclosure.

DETAILED DESCRIPTION

Figure 1A:
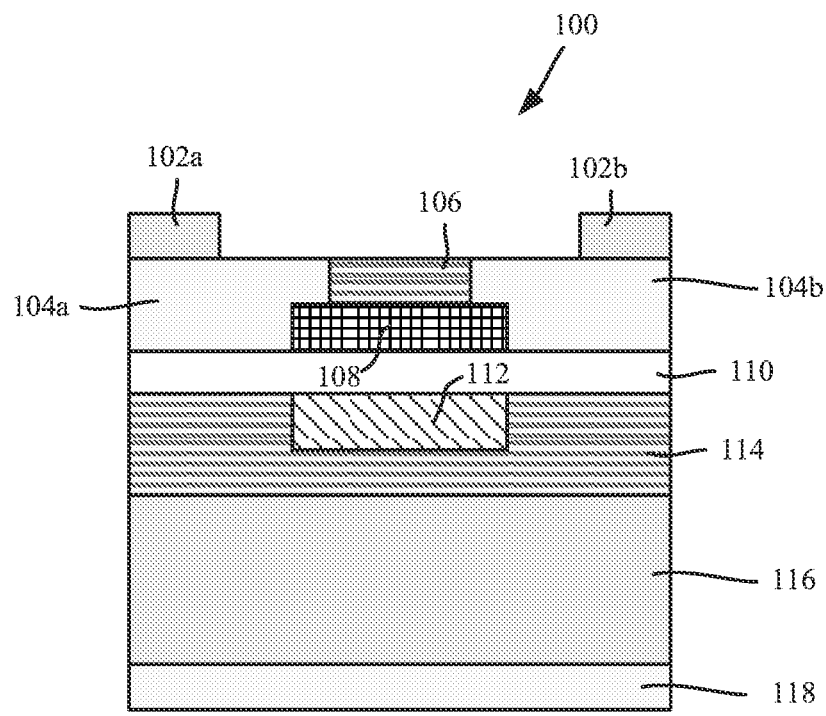
FIG. 1A is a planar implementation example of a chalcogenide-based element in which a phase change material (chalcogenide) can be actuated by a voltage or current pulse to change the resistance of the material, in accordance with various aspects and implementations of the subject disclosure.

Various aspects of the technology described herein are generally directed towards phase-change material-based (e.g., chalcogenide-based) radio frequency components, and more particularly, a multi-state tunable capacitive element for reconfigurable operation. The technology described herein facilitates a practical reconfigurable intelligent surface for wireless communication frequencies currently in use as well as those wireless communication frequencies planned for advanced networks beyond 5G.

As will be understood, actuation voltages programmatically applied to phase-change material can toggle the phase-change material between lower and higher resistance states. When such (e.g., chalcogenide) elements are arranged in a capacitive circuit, different effective capacitance values can be realized to control a change in the phase of a reflected or refracted electromagnetic wave. Indeed, analog-like fine tuning of capacitance can be achieved by controlling the states of such a capacitive device.

It should be understood that any of the examples herein are non-limiting. As one example, chalcogenide materials, e.g., alloys based on germanium-antimony-tellurium (GeSbTe), are described and evaluated as one very suitable phase change material for use in multi-state tunable capacitive elements; however this is only one non-limiting example, and other materials, including those not yet developed, can be leveraged by the technology described herein. Thus, any of the embodiments, aspects, concepts, structures, functionalities or examples described herein are non-limiting, and the technology may be used in various ways that provide benefits and advantages in communications and computing in general. It also should be noted that terms used herein, such as "optimize" or "optimal" and the like only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The following detailed description is merely illustrative and is not intended to limit embodiments and/or application or uses of embodiments. Furthermore, there is no intention to be bound by any expressed or implied information presented in the preceding sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Further, it is to be understood that the present disclosure will be described in terms of a given illustrative architecture; however, other architectures, structures, substrate materials and process features, and steps can be varied within the scope of the present disclosure.

It will also be understood that when an element such as a layer, region or substrate is referred to as being "on" or "over" another element, it can be directly on the other element or intervening elements can also be present. In contrast, only if and when an element is referred to as being "directly on" or "directly over" another element, are there are no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment," as well any other variations, appearing in various places throughout the specification are not necessarily all referring to the same embodiment. Repetitive description of like elements employed in respective embodiments is omitted for sake of brevity.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

A planar implementation approach 100 of the chalcogenide elements for the described technology is shown in FIG. 1A. In FIG. 1, contacts 102*a* and 102*b* are depicted as above metallization components 104*a* and 104*b*, respectively. A thermal barrier 106 is shown above the chalcogenide material 108, which in turn is above a thin insulation layer 110. An actuation mechanism 112 that outputs heat energy based on voltage or current pulses as described herein melt and quench the chalcogenide material 108 through the insulation layer 110, which when applied can change the state of the chalcogenide material 108.

The actuation mechanism 112 is further contained by another thermal barrier 114, which is atop a dielectric substrate 116. A bottom metallization strip 118 is below the dielectric substrate 116.

Phase change (chalcogenide) material is formed with alloys containing group VI elements such as sulfur (S), selenium (Se) and/or telluride (Te). Among these, the germanium-telluride (GeTe) alloy is generally the most popular for radio frequency and optical memory applications. Phase change material has a property of reversibly switching between amorphous and crystalline states upon specific heat treatment by controlled electrical pulses. The state in which atoms are arranged in a disorderly manner (short range order) is called the amorphous state, whereas the state where atoms are organized in an orderly manner (long range order) is called the crystalline state. The disordered amorphous state has a lower mean free path of conduction for electrons that impedes current flow due to electron scattering, thus resulting in a higher resistance state when compared to the crystalline state.

Figure 1B:
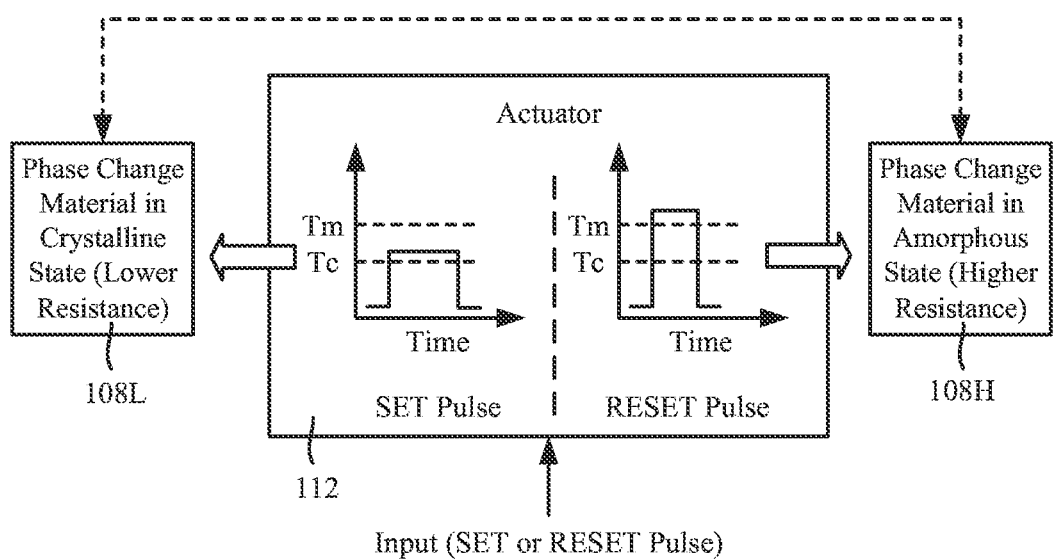
FIG. 1B shows an example of reversible switching of phase change material between an amorphous (high resistance) and crystalline (low resistance) states using a first electrical pulse for one state change and a second electrical pulse for a state change reversal, in accordance with various aspects and implementations of the subject disclosure.

As shown in FIG. 1B, a medium amplitude (typically 1-2 V) and relatively longer duration (typically on the order of 100 nanoseconds) SET electrical pulse (e.g., represented in the left portion of the actuator) is used for crystallization during a transition to the ON state. Energy from the SET pulse heats the material for sufficient time to crystallize the material and provides adequate time for atoms to reorganize to an orderly arrangement, thus transforming from an amorphous state to crystalline state 108L. To change to the amorphous state, a short duration (typically less than 100 nanoseconds) and high amplitude (typically >2 V) RESET electrical pulse is used. The RESET pulse provides sufficient energy to melt the material to disorder the atoms followed by rapid quenching to freeze the atoms, thus transforming the material from the crystalline state to the amorphous state 108H. Significantly, only a short duration pulse is required to switch the state of the material between states; the pulse transforms the material and latches the material into the state, without the need for continuous power in either state. The pulse duration and amplitude can be further optimized by tuning the ratio of GeSbTe alloy ratios.

Figure 2A:
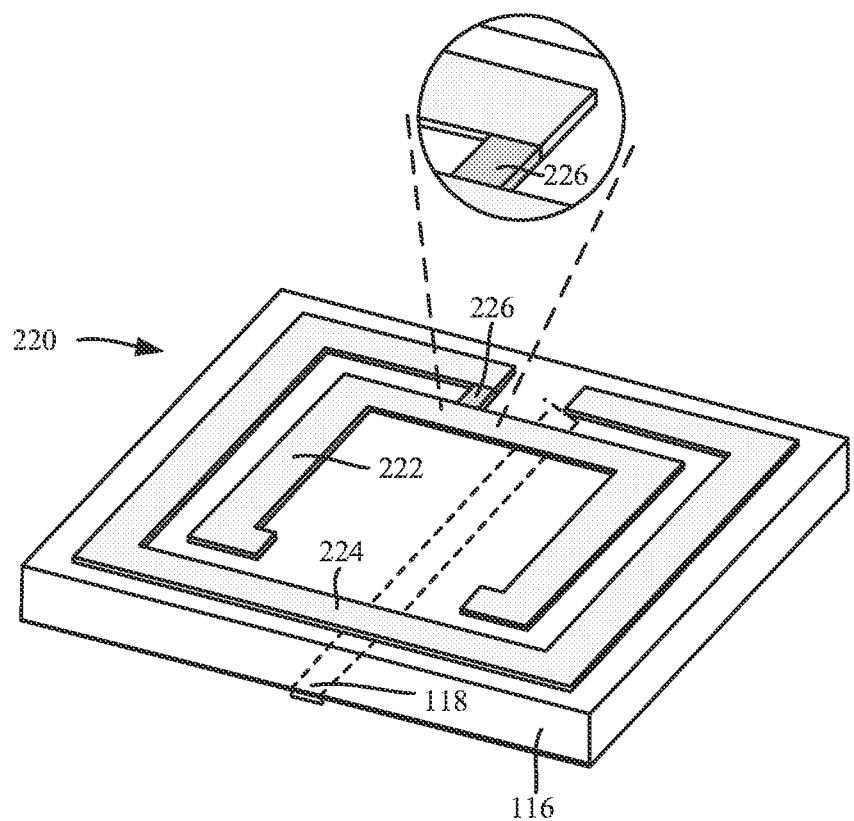
FIG. 2A shows an example of a unit cell suitable for use in a reconfigurable intelligent surface, showing a typical split-ring capacitor design coupled to a multi-state tunable element for reconfigurability, in accordance with various aspects and implementations of the subject disclosure.

FIG. 2A shows an example design of a unit-cell 220, including a split-ring type resonator formed by thin film metallization components 222 and 224. The split-ring type structure is formed on the top metal layer which is separated from the bottom metal strip 118 by a high permittivity dielectric substrate 116. The phase reconfigurability is achieved by using a chalcogenide, non-volatile multi-state tunable capacitor 226. Different reflection phases can be obtained by actuating a desired capacitance value or using a combination of capacitance values integrated within the unit-cell 220.

Figure 2B:
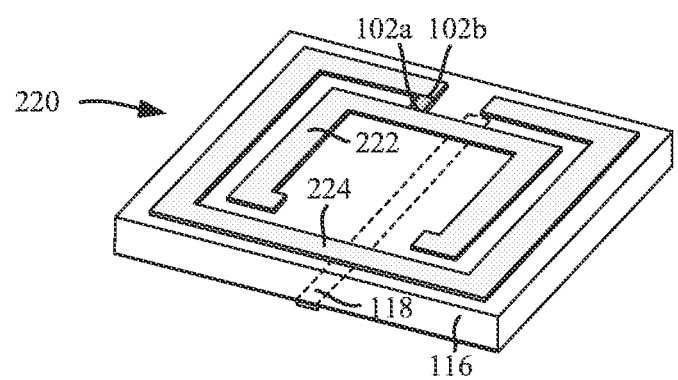
FIG. 2B shows an example of a unit cell that includes a non-volatile multi-state tunable element with two contacts a and b used for integration into the unit cell, in accordance with various aspects and implementations of the subject disclosure.

FIG. 2B shows the unit-cell 220 with the contacts 102a and 102b that couple the chalcogenide, non-volatile multi-state tunable capacitor 226 (FIG. 2A) to the thin film metallization components 222 and 224. The contacts 102a and 102b thus integrate the non-volatile multi-state tunable element into the unit cell 220 inside the periphery of the split ring (components 222 and 224).

The technology described herein thus provides a unit-cell device 220 for very high frequencies that can be used for 5G and 5G-Advanced applications, including millimeter wave capacitance change with zero static DC power consumption. The reconfigurability of the unit cell is achieved by integrating the chalcogenide multi-state tuning capacitor element 226 with the split-ring (components 222 and 224). In one implementation, the size of the tunable element 226 is smaller than 0.2×0.2 mm, thus making this technology a viable choice for highly miniaturized reconfigurable intelligent surface panels. For example, an array of these reconfigurable intelligent surface panels can be used to enhance outdoor wireless communications coverage as well as for indoor radio coverage enhancement. Depending on the choice of substrate 116, such reconfigurable intelligent surface panels can be developed on opaque materials, or transparent materials, e.g., to install on windows.

The multi-state tuning is achieved by integrating metal-insulator-metal capacitors or any other type of capacitors which can be developed using just two metal layers on a substrate, and integrating one or more chalcogenide switches, each having two states, a lower resistance state and a higher resistance state. A single switch is sufficient for two phase changes of a unit cell, e.g., zero or 180 degrees. However, as described herein, a circuit formed by a number of subcircuits can be used to implement analog-like tuning.

Figure 3:
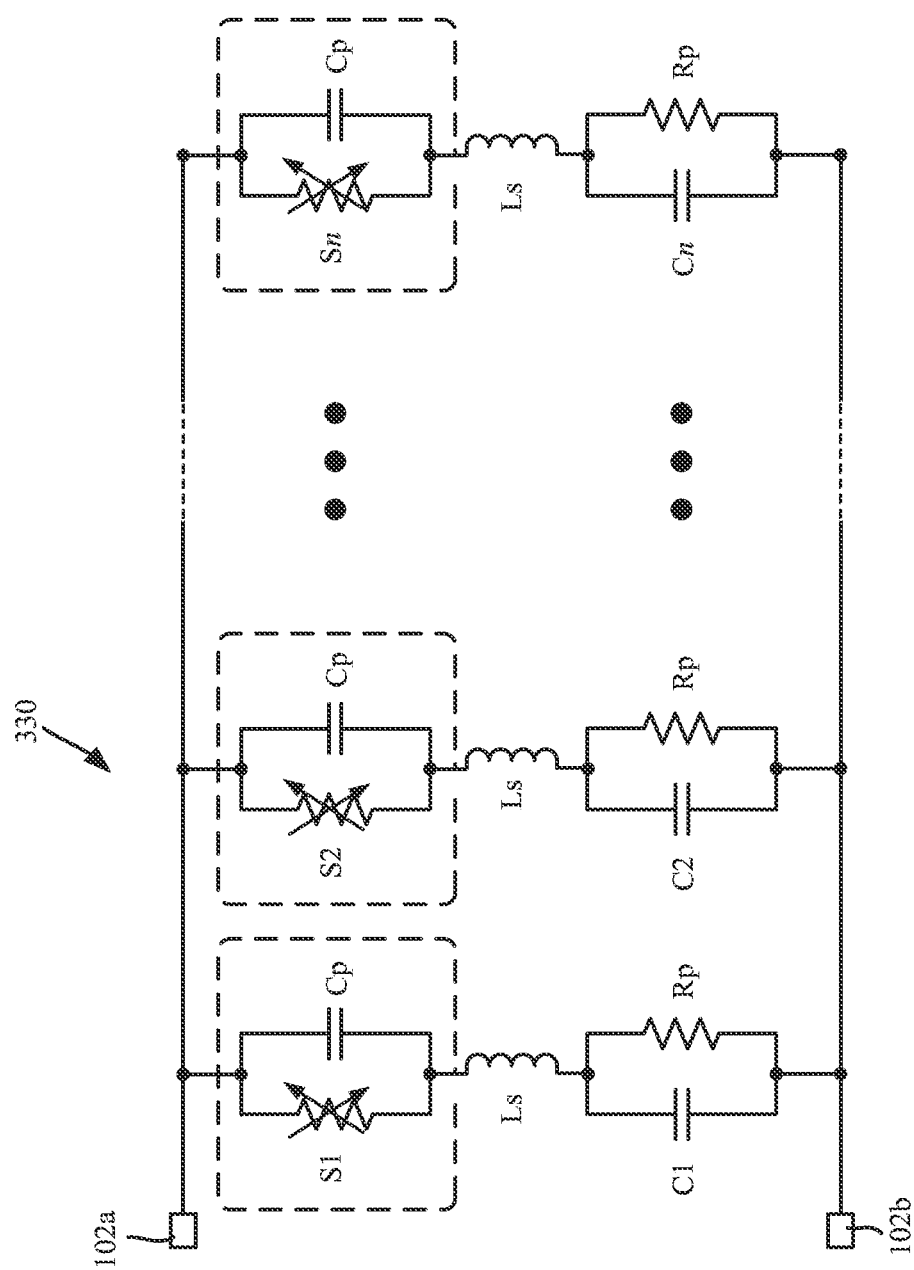
FIG. 3 shows an example circuit model of a tunable chalcogenide device, in which the switching elements' changes between states can provide a range of capacitance values, in accordance with various aspects and implementations of the subject disclosure.

One example circuit 330 for the tunable chalcogenide device is shown in FIG. 3, with the contacts 102a and 102b being accessible for coupling to the split-ring resonator as in FIG. 2B. In one implementation shown in FIG. 3, the switches S1-Sn are in series with the capacitors C1-Cn. Each chalcogenide switch can be independently actuated for a resistance change between the higher and lower resistance states with the application of a short actuation pulse of low voltage and a few nanoseconds time period, as described herein with reference to FIG. 1B.

The performance of each switch is dictated by a shunt capacitor Cp as shown in FIG. 3. The value of Cp can be reduced in various known ways. The Ls in each subcircuit is the series inductance between the chalcogenide switch and the capacitor Cn.

Each switching element is changeable between higher and lower resistance states. The capacitor values C1-Cn can be arranged to provide "n"-states with $2^n$ increasing capacitive branches from C1 to Cn.

The capacitance states can be implemented as a $2^N$ succession. For example, if C=0.1 pF, then the first state will be C1 (1×C=0.1 pF), C2 (2×C=0.2 pF), C3 (4×C=0.4 pF), C4 (8×C=0.8 pF), . . . Cn (2n×C=C*$2^n$ pF) and so on.

For practical implementation, the examples herein are directed to reasonable values of capacitance to keep the self-resonant frequency of the capacitors away from the design bandwidth of 12 GHz around center frequency 28 GHz. The capacitance C can be scaled to a lower value to have more precise control and have more stages, or on the other hand can have larger steps with higher initial C values. To obtain analog-like tuning from this digital step approach, a step value of C=0.1 pF is reasonable to implement on various substrates.

For C=0.1 pF, a chalcogenide switch connected to the respective branch can be actuated to add to the total capacitance of that branch. For example, if in one example design, the device is 4-bit, whereby 16-stage tuning can be achieved by either actuating the switches corresponding to an individual bit or a combination of two or more bits, such as C1 (0.1 pF), C2 (0.2 pF), C1+C2 (0.3 pF), C3 (0.4 pF), C1+C3 (0.5 pF), C2+C3 (0.6 pF), C1+C2+C3 (0.7 pF), C4 (0.8 pF), C1+C4 (0.9 pF), C2+C4 (1.0 pF), C1+C2+C4 (1.1 pF), C3+C4 (1.2 pF), C1+C3+C4 (1.3 pF), C2+C3+C4 (1.4 pF), or C1+C2+C3+C4 (1.5 pF).

From the example of 4-bit tuning, a bit or combination of bits can provide 0.1 pF of step size, which can be reduced by scaling the lowest capacitor, or by increasing from a 4-bit to 5-bit approach. With respect to a single tunable element, the phase precision comes without increasing the complexity of the design. Unlike some PIN diode-based designs, there is no need to add multiple elements to achieve more than two phase states. Further, most commercially available varactors, PIN diodes, or semiconductor switches require constant voltage in the steady state; in contrast, the chalcogenide switches described herein do not require any power to hold either state. When these elements are used in an array of hundreds or thousands of unit-cells, the power saving is exponential.

Figure 4:
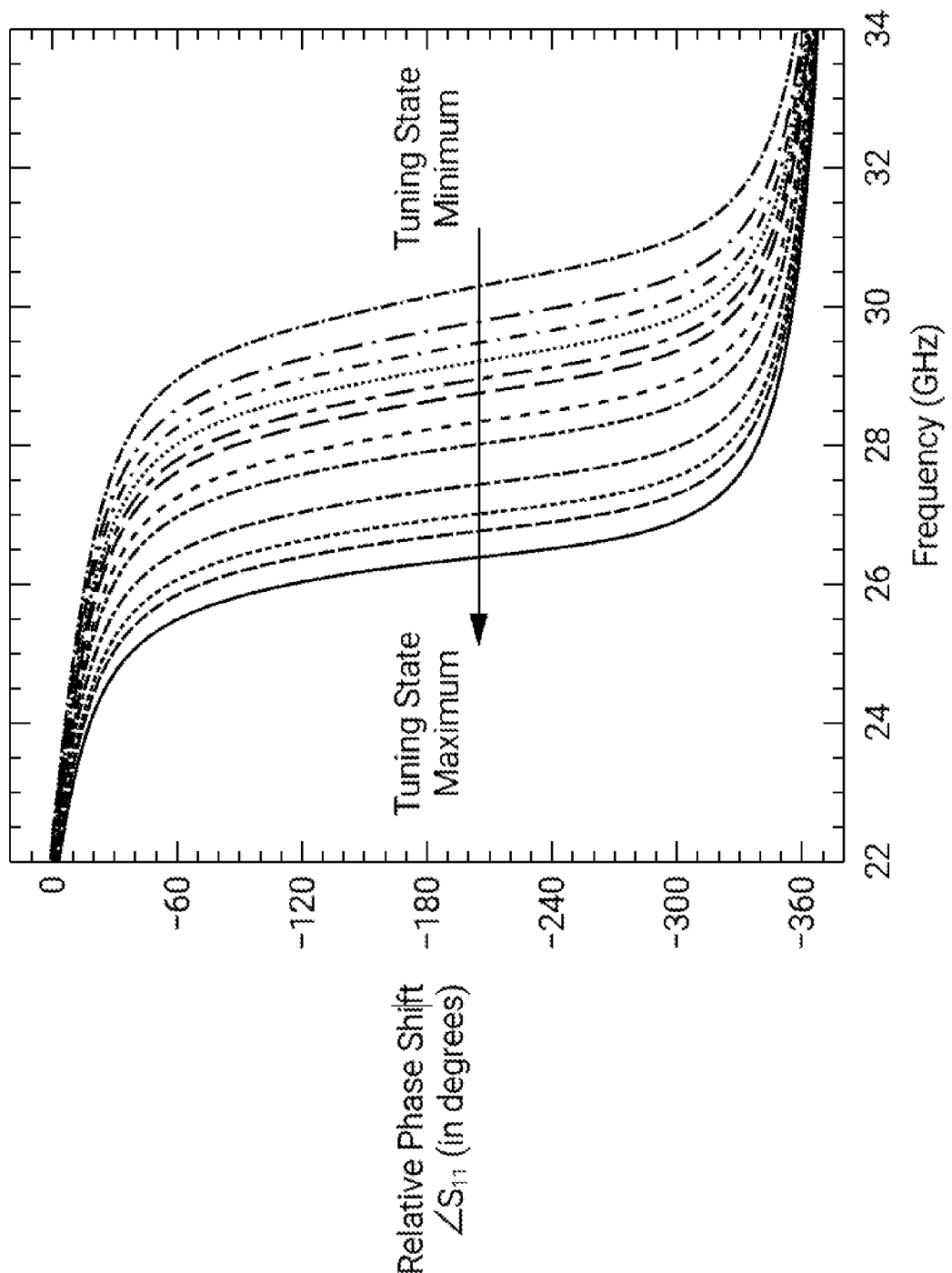
FIG. 4 is an example graphical representation of tunable relative phase shift offered to a reflected signal around the operational frequency of 28 gigahertz (GHz), in accordance with various aspects and implementations of the subject disclosure.

The device performance can be simulated using full-wave 3D electromagnetic (EM) simulation software, and the phase shift offered to the reflected signal can be evaluated for a discrete set of capacitance states of the chalcogenide capacitance, which can be electronically controlled. One example unit-cell was designed for operation around 28 GHz, which is the set of operational frequencies for 5G networks. The relative phase shift offered to the reflected signal from the unit-cell is graphically represented in FIG. 4, with the minimum tuning state corresponding to the lower end of the chalcogenide tunable capacitance range, and the maximum tuning state corresponding to the higher end of the capacitance range.

Figure 5:
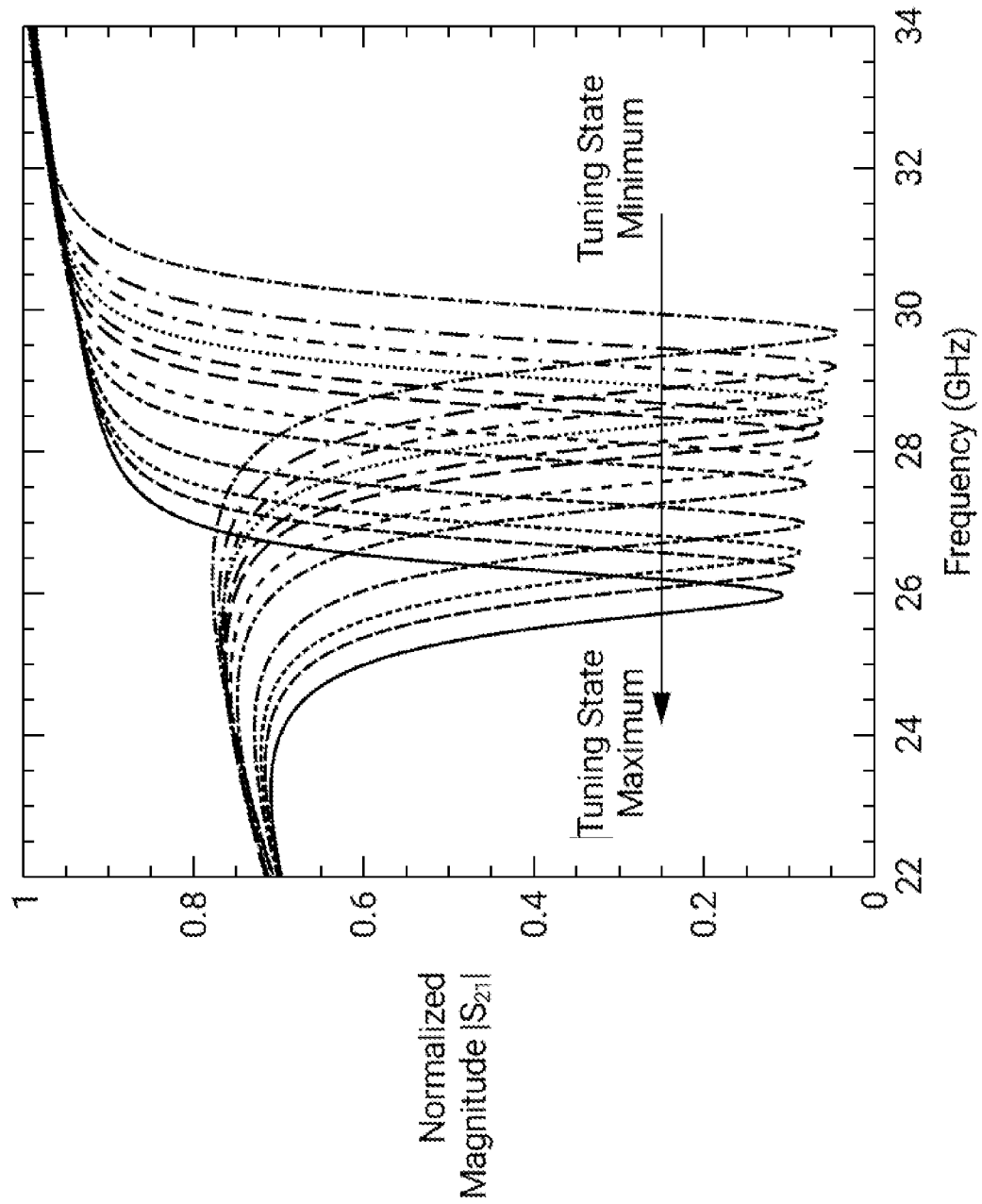
FIG. 5 is an example graphical representation showing the magnitude of the transmission coefficient ($|S_{21}|$) highlighting the shift in resonance frequency of the split-ring resonator with the change in capacitance of the chalcogenide tunable capacitor, in accordance with various aspects and implementations of the subject disclosure.
Figure 6:
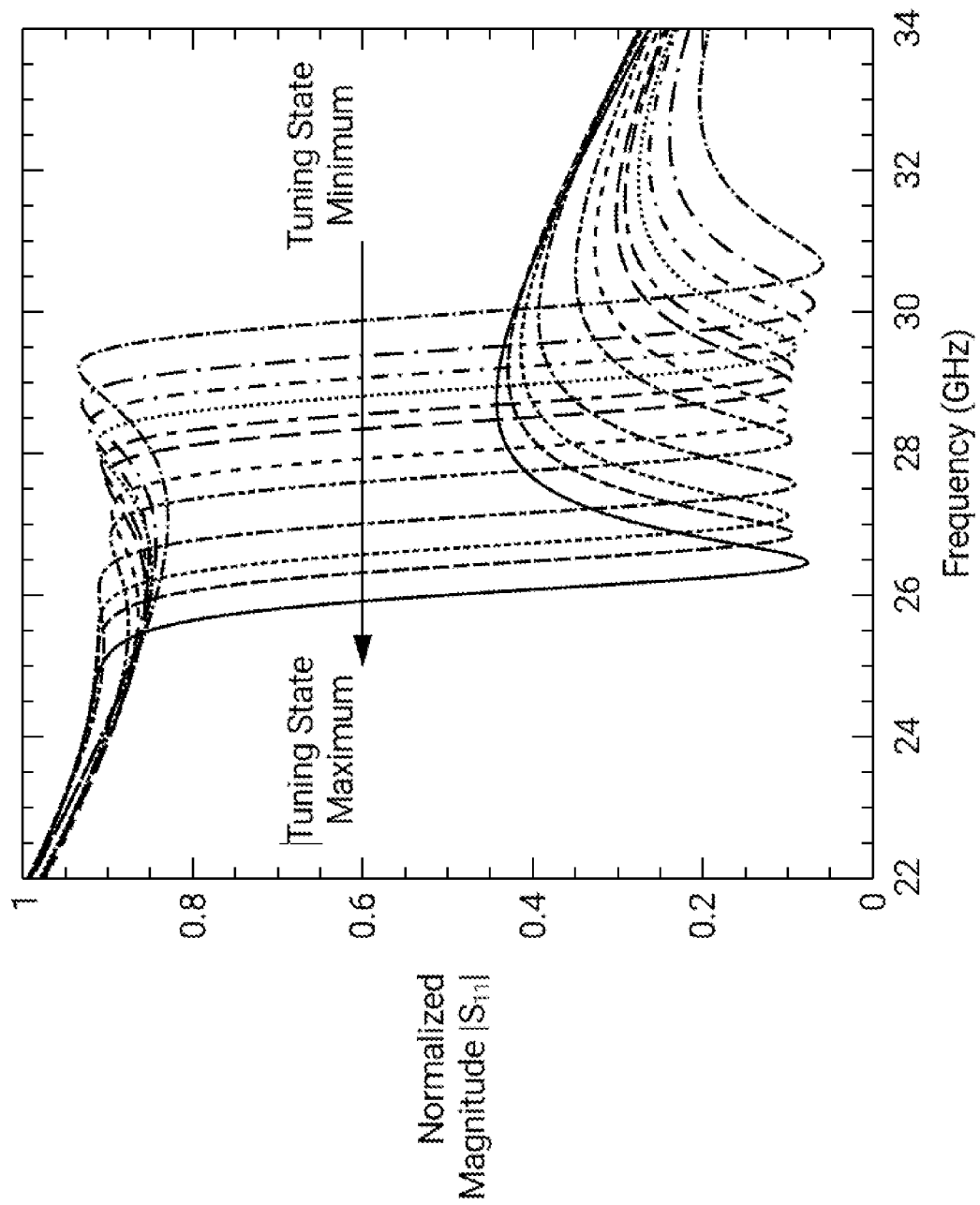
FIG. 6 is an example graphical representation showing the magnitude of the transmission coefficient ($|S_{11}|$) showing the shift with the tuning of capacitance, in accordance with various aspects and implementations of the subject disclosure.

For an application in which only two different phase shift states are needed, chalcogenide switches can be used instead of varactors, however as described herein, the technology facilitates much more granular control, and thus more phase shift options, when needed. FIGS. 5 and 6 show the shift in the resonance frequency, further confirming the phase shift achieved from the example device described herein. More particularly, FIG. 5 shows the magnitude of transmission coefficient (|S21|) highlighting the shift in resonance frequency of the split-ring resonator with the change in capacitance of the chalcogenide tunable capacitor. FIG. 6 shows the magnitude of reflection coefficient (|S11|) showing the shift with the tuning of capacitance. The simulations were carried out using finite element modeling.

Figure 7:
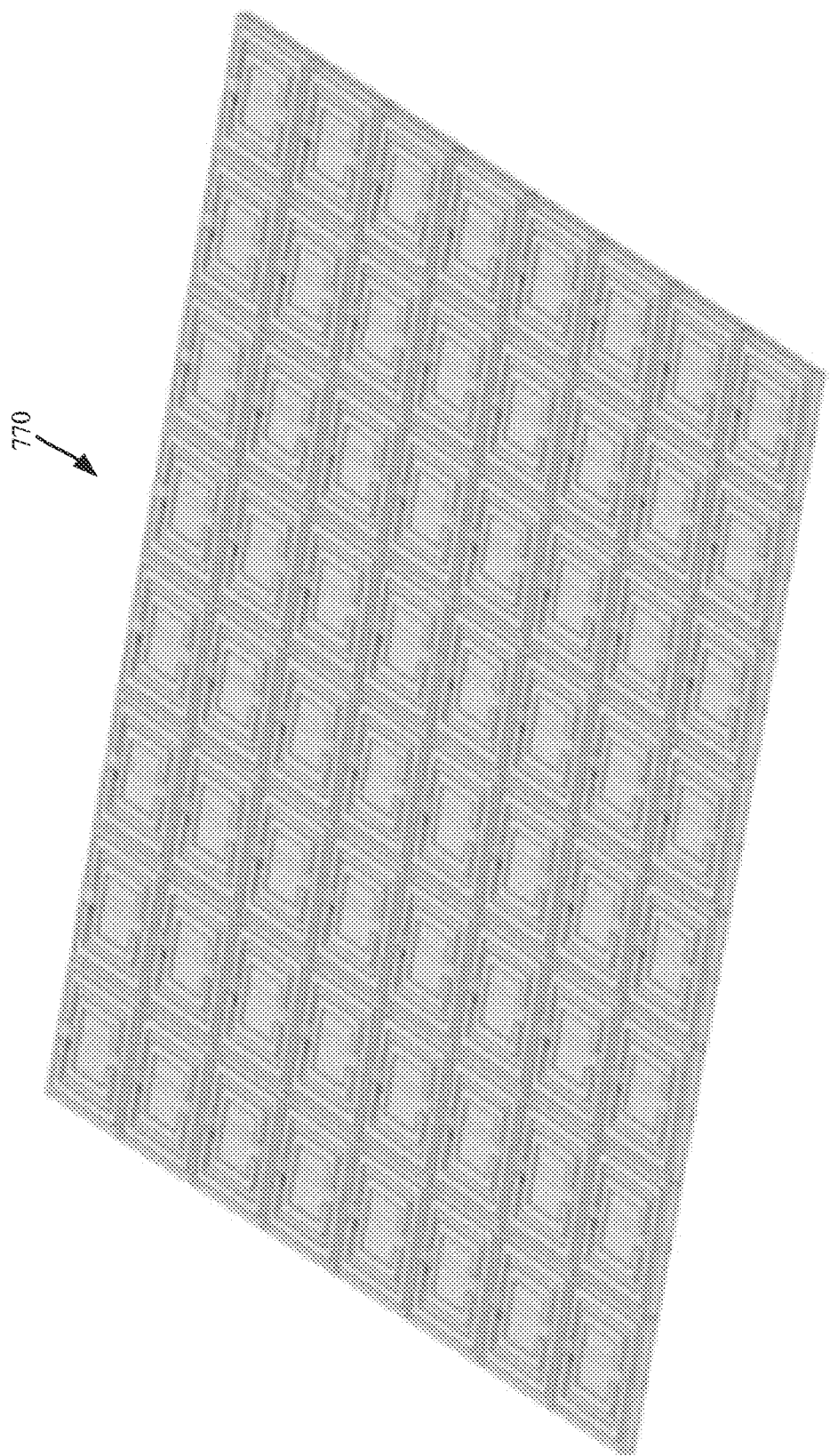
FIG. 7 is a top view representation of an example 8×8 lattice of unit-cells forming a reconfigurable intelligent surface, in accordance with various aspects and implementations of the subject disclosure.

A reconfigurable intelligent surface can be formed by arranging multiple unit-cells in a two-dimensional m×n array, such as shown in the lattice 770 depicted in FIGS. 7 and 8. An example 8×8 array of unit-cells is shown in the top view (FIG. 7) of the lattice structure surface 770. FIG. 9 shows a bottom view representation of the surface 770; the bottom metal strips 116(1)-116(8) are visible in this bottom view.

As previously seen from the above-described performance graphs, each unit-cell can alter the phase, hence bend, an impinging electromagnetic wave and redirect the wave in the desired direction. The redirection of larger reflected waves can be controlled by synchronizing the phase shift from a group of unit-cells and creating patterns of constructive and destructive interference. This interference pattern reforms the incident beam and sends it in a particular direction determined by the pattern. Such orchestration of phase shift from individual unit-cells can be controlled in a reconfigurable intelligent surface configuration via a field-programmable gate array (FPGA) controller or the like. To determine the reconfigurable intelligent surface configuration in dynamic real-life environment, a set of predefined reference signals (known to both transmitter and receiver) are sent from the base station and the channel impulse response is determined.

Figure 9A:
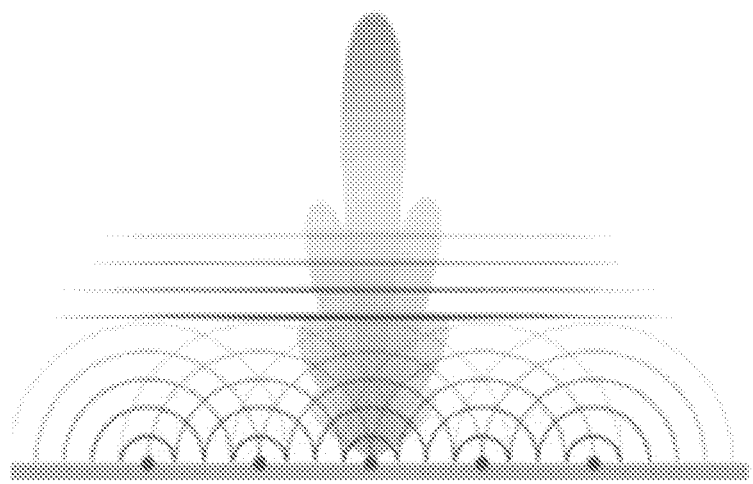
FIGS. 9A-9C are representations of phase shifts from unit cells configured such that a constructive interference of the reflected signals from each unit cell is achieved in a desired target direction, in accordance with various aspects and implementations of the subject disclosure.
Figure 9B:
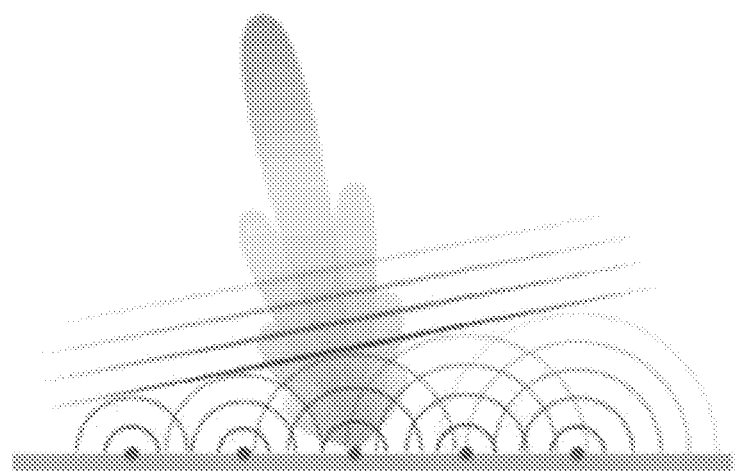
Figure 9C:
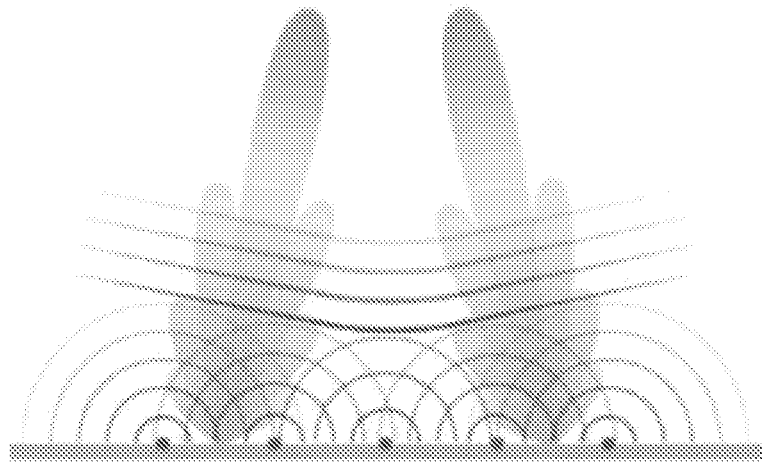

FIGS. 9A-9C show how the phase shifts from the unit-cells are configured such that a constructive interference of the reflected signals from each unit-cell is achieved in the desired target direction. Destructive interference to a desired direction can also be leveraged.

Figure 10:
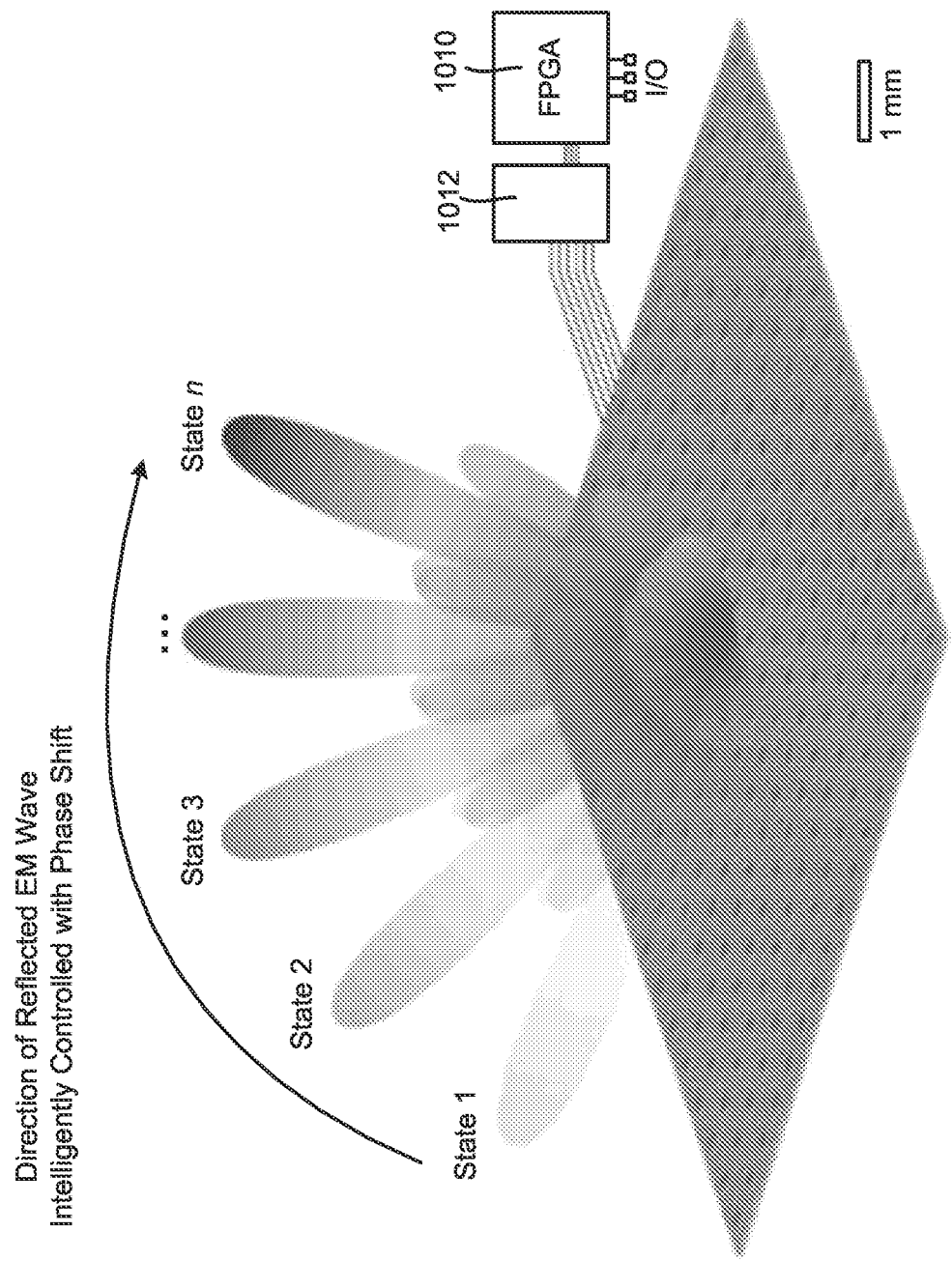
FIG. 10 is a representation of an example overall reconfigurable intelligent surface system showing the direction of the reflected beam being controlled by a configuration provided by a field programmable gate array, in accordance with various aspects and implementations of the subject disclosure.

As shown in FIG. 10, the overall reconfigurable intelligent surface system showing the direction of the reflected beam/electromagnetic wave is intelligently controlled with phase shift by the configuration, in this example via a field-programmable gate array. With respect to configuring the array digitally, a field-programmable gate array controller 1010 is used to provide the output, mapped to a cell and converted (block 1012) to the appropriate RESET or SET pulse based on the zero or one bit pattern instruction as needed, to each cell of the array of cells. The output gives instructions to the individual switching elements of the individual unit-cells, independent from each other switching element, and sets the cell's capacitance independent from each other cell. Actively tuning the phase change material-based (GeTe) varactors in each cell can be individually controlled by the field-programmable gate array 1010, which provides a coding output of 0s and 1s.

Unlike other reconfigurable intelligent surfaces (in which each unit-cell typically can only provide either a phase response of 0° or 180°; the coding for such a 1-bit digital cell state will be either "0" or "1" for OFF and ON switching, respectively), the analog-like reconfigurable intelligent surface described herein can use higher bit coding to describe the phase responses from individual unit-cells. Depending on the beam steering precision desired by a given application, a system can select the number of phase states needed. For example, a 1-bit system can provide 2 possible phase states (chalcogenide switches can be used) while as described above, a 4-bit system can provide 16 different phase state possibilities (e.g., the tunable chalcogenide capacitor as described herein) from each cell.

The technology described herein can function with a minimal power supply, as the electrical pulse is needed only during a change of configuration, a significant advantage over technologies that need continuous power to hold one of the states. Another significant and beneficial feature of this design is that the unit cells described herein can receive and transmit electromagnetic waves simultaneously, hence achieving full-duplex operation.

The technology described herein is suitable for reconfigurable intelligent surface-assisted wireless communications. Because the direct path between the access point and a target of interest can be fully/partially obstructed by other objects, the use of a reconfigurable intelligent surface can substantially improve the wireless network performance, particularly in crowded indoor/outdoor scenarios.

For example, with respect to an outdoor scenario, by installing the reconfigurable intelligent surface on common surfaces such as building walls, windows, billboards, traffic signs and the like, and because as described herein the direction of the reflected and/or refracted beams can be controlled, including remotely controlled, reasonably optimal reconfigurable intelligent surface deployment positions can be identified, along with the corresponding size of the reconfigurable intelligent surface needed. Reconfigurable intelligent surface placement and size can be in conjunction with the planning for a base station's position, or done afterwards by identifying the blind areas of poor signal strength in the network coverage map. This can not only improve the signal reception in the shadow areas, but also improve the data rates in the areas with an already good signal reception. Thus, a reconfigurable intelligent surface can be used for solving the network coverage problem of 5G/6G and even beyond, without adding much power/cost overhead.

Consider by way of example a typical scenario of an outdoor urban area with a single base station. For low frequency radio transmissions, the signal can propagate to long and far distances without significant attenuation due to its long wavelength. But high frequency signals suffer serious attenuation and blockage from objects, whereby the wireless coverage from a single base station will be weak, or even provide no coverage in certain zones. Depending on the location of the base station and the positions of the users, the (mostly) optimal location and size for reconfigurable intelligent surface on billboards, highway signs, walls, windows, and corners of the buildings can be selected.

The signals from the base station reflect off of (or can be refracted by) the passive reconfigurable intelligent surface, can be steered in the direction of most users, and also can be steered to other reconfigurable intelligent surface in the area for further reflection/refraction. The users close to the base station generally receive a direct path signal from the base station, and (likely) also receive a reflected signal from a reconfigurable intelligent surface. The users further away from the base station (or behind obstructions) can receive the reflected or refracted signals from one or multiple reconfigurable intelligent surfaces. One or more of the reconfigurable intelligent surfaces also can employ amplification to boost signals if and when appropriate.

In an indoor scenario, windows and walls can be covered with reconfigurable intelligent surface films, which can be generally transparent, in order to extend wireless coverage indoors. By locating such films on the windows, the signals coming from the outside can be refracted and boosted inside the building, enhancing the coverage inside. The signals to an illegitimate user, e.g., an eavesdropper, can be blocked by destructive interference.

One or more aspects can be embodied in a capacitive device, such as described and represented in the examples herein. The capacitive device can include a first capacitor having a capacitance value, the capacitor including a first conductor, a second conductor, and dielectric material between the first conductor and the second conductor. The capacitive device further can include a tunable capacitive device configured to selectively adjust the capacitance value of the capacitive device to a different capacitive value from the capacitance value of the first capacitor, the tunable capacitive device including a first contact coupled to the first conductor and a second contact coupled to the second conductor, and further including a capacitive circuit, the capacitive circuit comprising a switching element comprising phase change material that changes to a lower resistance state when heated by a first energy pulse, and changes to a higher resistance state when heated by a second energy pulse that is different from the first energy pulse, the switching element being coupled to a second capacitor to couple the second capacitor to the capacitive circuit, and decouple the second capacitor from the capacitive circuit, based on whether the phase change material is in the lower resistance state or in the higher resistance state. The capacitive device further can include a controllable energy transfer component that selectively transfers first heat to the phase change material via the first energy pulse to change the phase change material to the lower resistance state, and transfers second heat via the second energy pulse to the phase change material to change the phase change material to the lower resistance state.

The switching element can be electrically coupled in parallel with the second capacitor to join the second capacitor to the capacitive circuit when the switching element is in the higher resistance state to increase the capacitance value of the capacitive device.

The switching element can be electrically coupled in parallel with the second capacitor to join the second capacitor to the capacitive circuit when the switching element is in the higher resistance state, and wherein the second capacitor, when joined to the capacitive circuit, is electrically coupled in series via an inductive component to a third capacitor, the third capacitor electrically being coupled in parallel with a resistive component.

The capacitive circuit can be one capacitive circuit of a group of electrically coupled capacitive circuits, the group including at least one other capacitive circuit, in which for each other capacitive circuit of the at least one other capacitive circuit, the other capacitive circuit can include a switching element comprising phase change material that changes to the lower resistance state when heated by the first energy pulse, and the higher resistance state when heated by the second energy pulse that is different from the first energy pulse. The switching element of the other capacitive circuit can be coupled to a second capacitor to couple the second capacitor to the other capacitive circuit, and decouple the second capacitor from the other capacitive circuit, based on whether the phase change material of the other capacitive circuit is in the lower resistance state or in the higher resistance state. The capacitive circuits of the group can be independently controllable via respective switching elements to tune the capacitive device to one capacitance value of a group of available capacitance values based on respective states of the respective switching elements.

The capacitive circuits of the group can be electrically coupled in parallel with one another. At least one of the capacitive circuits of the group can have a different capacitance value relative to at least one other capacitive circuit of the group. The capacitive circuits of the group can have different capacitance values varying from one another in an exponential configuration. The capacitive device of claim 8, wherein the exponential configuration can be a two-to-the-Nth power ($2^N$) succession.

The capacitance value of the capacitive device can be variable to control a phase shift of a unit cell of a reconfigurable intelligent surface.

The reconfigurable element can be part of a of a group reconfigurable unit cells that are collectively arranged into the reconfigurable intelligent surface.

The first conductor and the second conductor of the first capacitor of the unit cell can be configured as a split-ring resonator capacitor.

One or more aspects can be embodied in a variable capacitor, such as represented herein. The variable capacitor can include a first conductor and a second conductor configured as a first capacitor with a first capacitance value. The variable capacitor can include variable capacitive circuit coupled between the first conductor and the second conductor to controllably adjust a capacitance of the variable capacitor by adding a variable amount of capacitance to the first capacitance value, the variable capacitive circuit including a group of respective subcircuits, and the respective subcircuits of the group comprising respective capacitors electrically coupled to respective chalcogenide material-based switching elements that, independent from one another, remain in respective higher resistance states or respective lower resistance states until selectively actuated. The variable capacitor can include respective actuators configured to selectively apply heat output to the respective chalcogenide material-based switching elements, the heat output of the respective actuators being selectively controlled with respective electrical pulses that set at least some of the respective chalcogenide material-based switching elements to a lower resistance state or reset at least some of the respective chalcogenide material-based switching elements to a higher resistance state. The respective subcircuits can add different amounts of capacitance to the variable capacitive circuit based on whether the respective switching elements of the respective subcircuits are independently set to the lower resistance state or independently reset to the higher resistance state.

The respective subcircuits of the group can be electrically coupled to one another in parallel.

The first conductor and the second conductor can be configured as a split-ring resonator capacitor.

The variable capacitive circuit can be controlled to adjust the capacitance of the variable capacitor to vary a phase shift of a unit cell of a reconfigurable intelligent surface.

One or more aspects can be embodied in a variable capacitor, such as described and represented herein. The variable capacitor can include a split ring capacitor having a first capacitance value, and a non-volatile tunable element electrically coupled to contacts of the split ring capacitor to selectively add to the first capacitance value. The non-volatile tunable element can include a group of capacitive subcircuits electrically coupled in parallel to one another between the contacts, each capacitive subcircuit of the group of capacitive subcircuits comprising a phase change material-based switching element that remains in a high resistance state or a low resistance state as controlled by a set pulse or a reset pulse, respectively. The phase change material-based switching element can be controllable to add a capacitance of a capacitor of the capacitive subcircuit when the phase change material-based switching element is in the low resistance state, or exclude the capacitance of the capacitor of the capacitive subcircuit when the phase change material-based switching element is in the high resistance state.

Each capacitive subcircuit further can further include a shunt capacitor component, an inductive component, and a parallel capacitor and resistor combination; the phase change material-based switching element can be electrically coupled in parallel to the shunt capacitor. The inductive component, and the parallel capacitor and resistor combination, can be electrically coupled in series.

At least two of the capacitive subcircuits of the group can have different capacitance values from one another.

The non-volatile tunable element can be controlled to adjust the capacitance of the variable capacitor to vary a phase shift of a unit cell of a reconfigurable intelligent surface.

As can be seen, there is described herein tunable capacitive devices, including for unit cells, and a highly reconfigurable intelligent surface design, in which programming the actuation voltage to the chalcogenide elements realizes different effective capacitance values, which leads to changes in the phases of a reflected electromagnetic wave. Analog-like fine tuning of capacitance can be achieved by controlling the actuation states per single element, whereby the phase precision comes without increasing the complexity of the design. The reconfigurable intelligent surface described herein can operate at sub-6 GHz frequencies as well as mmWave frequencies for 5G and 5G-Advanced, e.g., for 6G, sub-terahertz and even higher frequencies are being explored. Chalcogenide-based radio frequency switches and tuning elements demonstrate suitable performance at mmWave frequencies, which can be extended to the sub-terahertz frequency range.

Moreover, the compact size of the chalcogenide element makes it highly suitable for monolithic integration with a wide range of technologies. Each chalcogenide switch can be implemented with a compact footprint in sub-micron sizes, including for shrinking reconfigurable intelligent surface cell size at higher frequencies, in which chalcogenide capacitive elements/switches fit more than adequately and can be monolithically integrated within each unit cell.

Still further, the reconfigurable intelligent surface offers low ON-state insertion loss; because some of the chalcogenide materials including germanium telluride has very low crystalline state (ON state) resistance of less than one Ohm, and low OFF-state capacitance of 7 fF (femto-farad), the figure of merit of the switches is 0.04 ps (picoseconds), which is far higher than any known commercially available PIN diodes or semiconductor RF switches.

The reconfigurable intelligent surface design and tunable capacitive element technology described herein needs power only during a state transition, thus saving significant power when in a steady state. Indeed, the chalcogenide material (especially germanium telluride) only needs an electrical pulse when transitioning from one state to another, as the material subsequently latches into a state. Hence, chalcogenide material does not need a continuous supply of power, which makes the design described herein suitable for implementing reconfigurable intelligent surfaces that can benefit from low power for operation.

What has been described above include mere examples. It is, of course, not possible to describe every conceivable combination of components, materials or the like for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A capacitive device, comprising:
a first capacitor having a capacitance value, the capacitor comprising a first conductor, a second conductor, and dielectric material between the first conductor and the second conductor;
a tunable capacitive device configured to selectively adjust the capacitance value of the capacitive device to a different capacitive value from the capacitance value of the first capacitor, the tunable capacitive device comprising a first contact coupled to the first conductor and a second contact coupled to the second conductor, and further comprising a capacitive circuit, the capacitive circuit comprising a switching element comprising phase change material that changes to a lower resistance state when heated by a first energy pulse, and changes to a higher resistance state when heated by a second energy pulse that is different from the first energy pulse, the switching element being coupled to a second capacitor to couple the second capacitor to the capacitive circuit, and decouple the second capacitor from the capacitive circuit, based on whether the phase change material is in the lower resistance state or in the higher resistance state; and
a controllable energy transfer component that selectively transfers first heat to the phase change material via the first energy pulse to change the phase change material to the lower resistance state, and transfers second heat via the second energy pulse to the phase change material to change the phase change material to the lower resistance state.

2. The capacitive device of claim 1, wherein the switching element is electrically coupled in parallel with the second capacitor to join the second capacitor to the capacitive circuit when the switching element is in the higher resistance state to increase the capacitance value of the capacitive device.

3. The capacitive device of claim 1, wherein the switching element is electrically coupled in parallel with the second capacitor to join the second capacitor to the capacitive circuit when the switching element is in the higher resistance state, and wherein the second capacitor, when joined to the capacitive circuit, is electrically coupled in series via an inductive component to a third capacitor, the third capacitor electrically being coupled in parallel with a resistive component.

4. The capacitive device of claim 1, wherein the capacitive circuit is one capacitive circuit of a group of electrically coupled capacitive circuits, the group comprising at least one other capacitive circuit, and wherein for each other capacitive circuit of the at least one other capacitive circuit, the other capacitive circuit comprises a switching element comprising phase change material that changes to the lower resistance state when heated by the first energy pulse, and the higher resistance state when heated by the second energy pulse that is different from the first energy pulse, and the switching element of the other capacitive circuit is coupled to a second capacitor to couple the second capacitor to the other capacitive circuit, and decouple the second capacitor from the other capacitive circuit, based on whether the phase change material of the other capacitive circuit is in the lower resistance state or in the higher resistance state.

5. The capacitive device of claim 4, wherein the capacitive circuits of the group are independently controllable via respective switching elements to tune the capacitive device to one capacitance value of a group of available capacitance values based on respective states of the respective switching elements.

6. The capacitive device of claim 4, wherein the capacitive circuits of the group are electrically coupled in parallel with one another.

7. The capacitive device of claim 6, wherein at least one of the capacitive circuits of the group has a different capacitance value relative to at least one other capacitive circuit of the group.

8. The capacitive device of claim 6, wherein the capacitive circuits of the group have different capacitance values varying from one another in an exponential configuration.

9. The capacitive device of claim 8, wherein the exponential configuration comprises a two-to-the-Nth power ($2^N$) succession.

10. The capacitive device of claim 1, wherein the capacitance value of the capacitive device is variable to control a phase shift of a unit cell of a reconfigurable intelligent surface.

11. The capacitive device of claim 10, wherein the reconfigurable element is part of a of a group of reconfigurable unit cells that are collectively arranged into the reconfigurable intelligent surface.

12. The capacitive device of claim 1, wherein the first conductor and the second conductor of the first capacitor of the unit cell are configured as a split-ring resonator capacitor.

13. A variable capacitor, comprising:

a first conductor and a second conductor configured as a first capacitor with a first capacitance value;

a variable capacitive circuit coupled between the first conductor and the second conductor to controllably adjust a capacitance of the variable capacitor by adding a variable amount of capacitance to the first capacitance value, the variable capacitive circuit comprising a group of respective subcircuits, and the respective subcircuits of the group comprising respective capacitors electrically coupled to respective chalcogenide material-based switching elements that, independent from one another, remain in respective higher resistance states or respective lower resistance states until selectively actuated; and respective actuators configured to selectively apply heat output to the respective chalcogenide material-based switching elements, the heat output of the respective actuators being selectively controlled with respective electrical pulses that set at least some of the respective chalcogenide material-based switching elements to a lower resistance state or reset at least some of the respective chalcogenide material-based switching elements to a higher resistance state, wherein the respective subcircuits add different amounts of capacitance to the variable capacitive circuit based on whether the respective switching elements of the respective subcircuits are independently set to the lower resistance state or independently reset to the higher resistance state.

14. The variable capacitor of claim 13, wherein the respective subcircuits of the group are electrically coupled to one another in parallel.

15. The variable capacitor of claim 13, wherein the first conductor and the second conductor are configured as a split-ring resonator capacitor.

16. The variable capacitor of claim 13, wherein the variable capacitive circuit is controlled to adjust the capacitance of the variable capacitor to vary a phase shift of a unit cell of a reconfigurable intelligent surface.

17. A variable capacitor, comprising:

a split ring capacitor having a first capacitance value; and a non-volatile tunable element electrically coupled to contacts of the split ring capacitor to selectively add to the first capacitance value, the non-volatile tunable element comprising a group of capacitive subcircuits electrically coupled in parallel to one another between the contacts, each capacitive subcircuit of the group of capacitive subcircuits comprising a phase change material-based switching element that remains in a high resistance state or a low resistance state as controlled by a set pulse or a reset pulse, respectively, and the phase change material-based switching element controllable to add a capacitance of a capacitor of the capacitive subcircuit when the phase change material-based switching element is in the low resistance state, or exclude the capacitance of the capacitor of the capacitive subcircuit when the phase change material-based switching element is in the high resistance state.

18. The variable capacitor of claim 17, wherein each capacitive subcircuit further comprises a shunt capacitor component, an inductive component, and a parallel capacitor and resistor combination, and wherein the phase change material-based switching element is electrically coupled in parallel to the shunt capacitor, and the inductive component, and the parallel capacitor and resistor combination, are electrically coupled in series.

19. The variable capacitor of claim 18, wherein at least two of the capacitive subcircuits of the group have different capacitance values from one another.

20. The variable capacitor of claim 17, wherein the non-volatile tunable element is controlled to adjust the capacitance of the variable capacitor to vary a phase shift of a unit cell of a reconfigurable intelligent surface.

* * * * *